April 28, 1959 — H. C. SILENT — 2,883,907
STEREOSCOPE
Filed Oct. 11, 1954 — 2 Sheets-Sheet 1

INVENTOR.
Harold C. Silent
BY H. W. Brelsford
ATTORNEY

April 28, 1959   H. C. SILENT   2,883,907
STEREOSCOPE

Filed Oct. 11, 1954   2 Sheets-Sheet 2

INVENTOR.
Harold C. Silent
BY H. W. Brelsford
ATTORNEY

United States Patent Office 2,883,907
Patented Apr. 28, 1959

2,883,907

STEREOSCOPE

Harold C. Silent, Los Angeles, Calif., assignor to Hycon Mfg. Company, Pasadena, Calif., a corporation of Delaware Application October 11, 1954, Serial No. 461,507

1 Claim. (Cl. 88—29)

My invention relates to stereo viewers and has particular reference to a stereo viewer for oppositiaxially disposed pictures.

Oppositiaxial pictures are those having their axes oppositely disposed, that is, picture pairs are arranged head to head or toe to toe on the viewing frame. This system of picture orientation is especially useful where the stereo pair of pictures is disposed on a single film strip. In such cases the width of the picture frame is transverse to the strip, thus obtaining maximum utilization of the available film area. A further property of this system of picture orientation is that the pictures do not have to be separated, i.e., cut apart, to be transposed, as is usually the case in the conventional arrangement of the pictures side by side, but the transposition is effected by the manner in which the stereo pair as originally photographed is inserted into the viewing device.

Stereo viewers or stereoscopes have been used for picture pairs on opaque material. Currently, however, stereo picture pairs are commonly in the form of transparencies, especially color transparencies, and this invention will be described with reference to a stereoscope for use with transparencies or other back illuminated pictures, although it is not to be construed that stereo pairs on opaque material with front illumination are excluded from viewing with this device.

It is a general object of my invention to provide an improved stereo viewer.

Another object is to provide a self-contained, electrically illuminated stereo viewer that has adjustments for focus and interpupillary distance.

A further object is to provide a stereo viewer for oppositiaxially oriented picture pairs wherein the interocular or interpupillary distance adjustment is simply effected. Still another object is to provide a stereo viewer of simple and inexpensive yet rugged mechanical construction.

Figure 1:
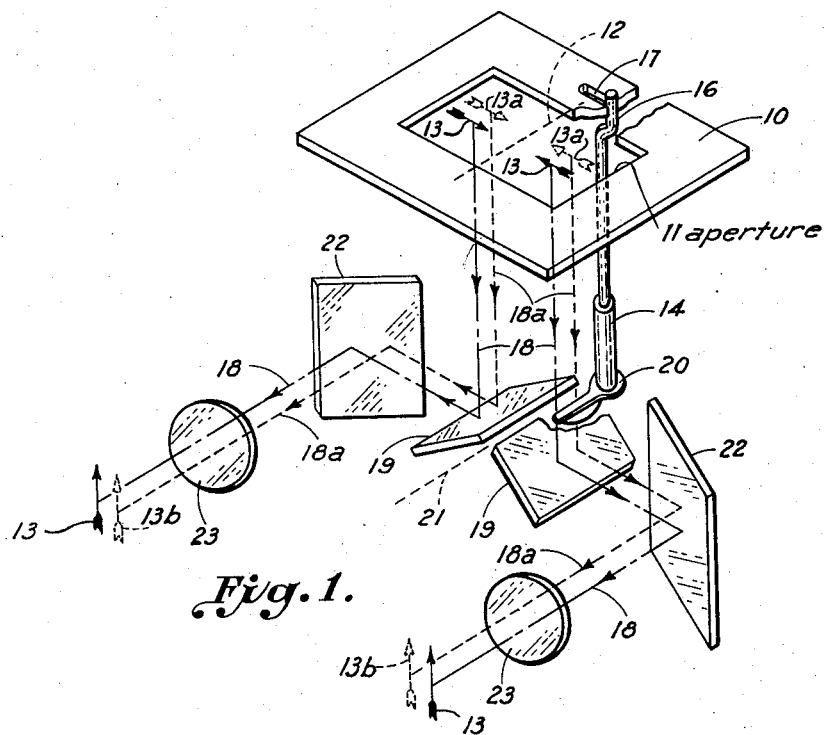
Figure 2:
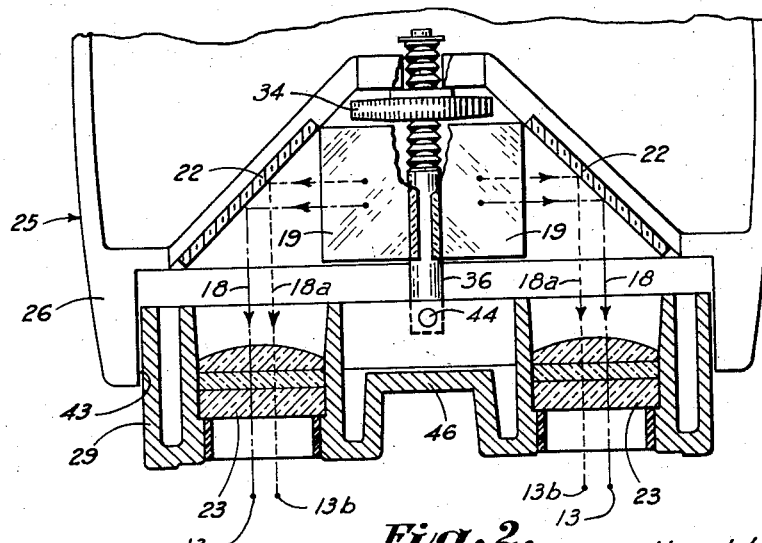
Figure 3:
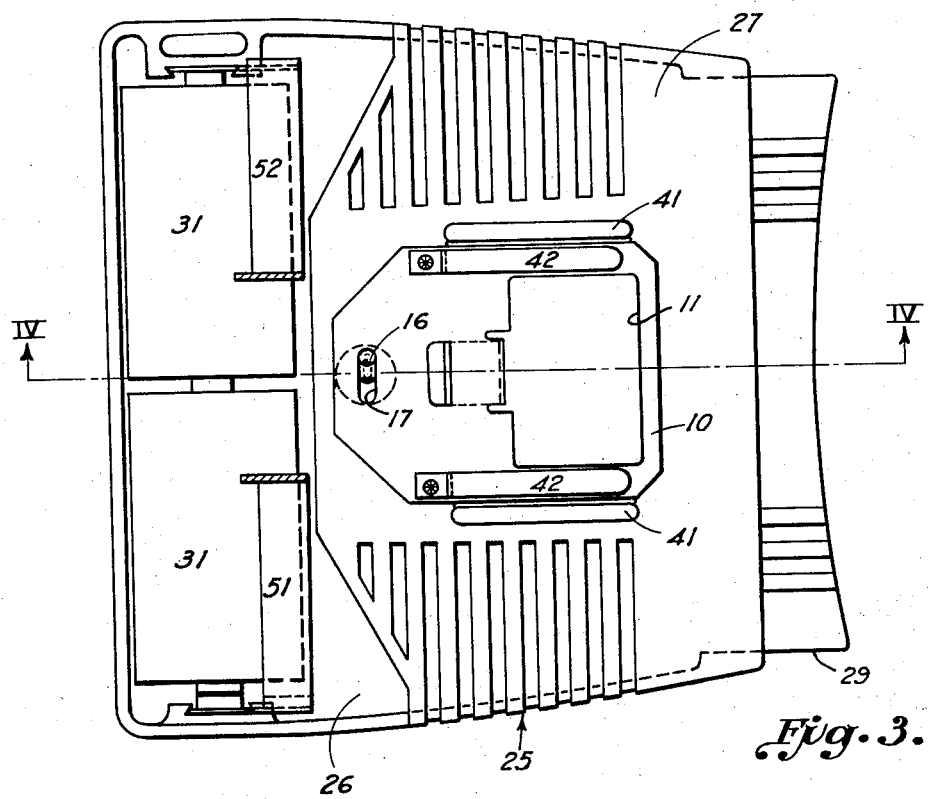

Other objects and advantages of my invention will be apparent in the following description and claim considered together with the accompanying drawings forming an integral part of this specification and in which, Fig. 1 is a diagrammatic view in perspective of the optical system of a viewer embodying the invention, Fig. 2 is a horizontal sectional view through the forward part of a viewer embodying the invention and illustrating the movable focusing mechanism as well as the mirrors, Fig. 3 is a plan view of the viewer of Fig. 2 but with the cowling piece removed therefrom.

Figure 4:
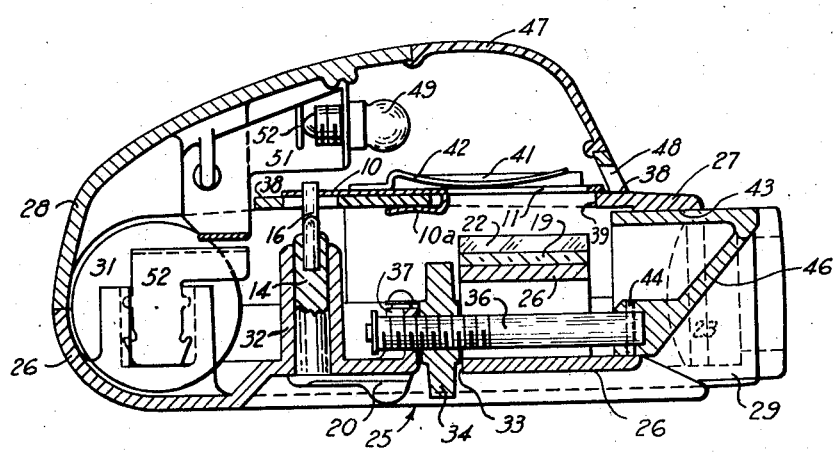

Fig. 4 is a sectional view along the line IV—IV of Fig. 3 of the completely assembled viewer of Fig. 1.

Referring to Fig. 1 there is illustrated a picture holding frame 10 having an interior aperture 11 over which may be disposed a film having picture pairs which give rise to a stereo image. The picture pairs may be divided approximately at the middle of the aperture 11 as illustrated by a broken line 12. The image disposed on such a picture pair may be represented by the arrows 13 and it will be noted that these arrows are disposed so that they are pointing toward each other, that is, they are oppositiaxially oriented with respect to each other.

The frame 10 may be moveable particularly in accordance with the invention by means of a shaft 14 having a crank 16 which fits within a slot 17. When the shaft 14 is rotated by means of a thumb lever 20 the crank 16 engaging the slot moves the frame 10 backward and forward along a line parallel to the picture dividing line 12.

The image 13 or other object which is desired to be viewed may be suitably illuminated so that light rays may emanate therefrom and proceed along lines 18 until these rays strike a pair of angularly disposed mirrors 19. These mirrors 19 are disposed substantially one under each half of the aperture 11 in the frame 10 so as to receive the light rays from that particular half of the aperture 11. While these mirrors may not physically or mechanically touch or intersect each other, when the surface of the mirrors is projected they will form a line of intersection illustrated generally by the line 21 and it will be noted that this line is generally parallel to the image dividing line 12. The light rays 18 upon striking the mirrors 19 are reflected outwardly from the line 21 at approximately right angles until they strike a second pair of angularly disposed mirrors 22. These mirrors need not intersect each other but if their reflecting planes are projected they will form a line of intersection that is approximately at right angles to the line 21 of the first mirror pair 19. Accordingly, the light rays 18 are reflected again at right angles but in a different plane so that they are approximately parallel to the intersection line 21. Suitable ocular lenses 23 may be provided along the path of the light rays 18 so that a person may focus upon the image 13 disposed in the picture frame 10.

It is well known that in order to comfortably and clearly view stereo picture pairs it is necessary that the light rays be spread or adjusted along the line between the person's eyes and the distance between these two rays is commonly referred to as the interocular or interpupillary distance. Accordingly the adjustment is commonly referred to as the interocular or interpupillary adjustment. Various means have been proposed for adjusting the interpupillary distance for mirror pairs disposed at right angles to each other for viewing oppositiaxially disposed pictures or images, including translation of one or the other or both mirror pairs, or rotation of one or both mirror pairs together with physical translation or movement of the ocular lenses. These technics, however, are expensive and difficult to accomplish for a stereo viewer priced to sell in the popular or amateur price ranges.

I have discovered that this interocular adjustment may be simply, accurately and economically effected by moving the picture pairs along a line parallel to the line of intersection of the first mirror pair, that is, parallel to the line 21 of Fig. 1. The effect of such movement is illustrated in Fig. 1 wherein the image 13 is shown in broken outline at 13a and the rays therefrom are designated as 18a. This movement, of course, is accomplished by a rotation of the thumb lever 20 in a counterclockwise direction as illustrated in Fig. 1 so that the crank 16 acting in the slot 17 moves the picture frame 10 toward the upper right hand corner of the drawing sheet as viewed in Fig. 1.

The rays 18a will strike the mirrors 19 at a distance along the line 21 corresponding to the amount of movement of the frame 10 and these rays in turn will be reflected at right angles to the line 21. Since, however, these rays strike the mirrors 22 at a point closer to their line of convergence or intersection than the rays 18, they will be reflected parallel to the line 21 but at a distance closer to the line 21 than the rays 18. This, accordingly, reduces the interpupillary distance as represented by the positions of the broken arrows at 13b. For enlargement or extension of the interpupillary distance, movement of the frame in the reverse direction may be made.

It will be realized by those skilled in the art that the illustration of the rays 18 and 18a passing through the ocular lenses 23 is purely diagrammatic inasmuch as the usual convergence and crossing of lines would take place during passage through the lenses. The illustration, therefore, is purely for demonstration and not for technical accuracy.

Also it will be appreciated by those skilled in the art that a single lens could be used in this system by disposing it between the mirrors 19 and the picture frame 10 so that the optical system would be approximately that shown in the patent application of Piguet filed November 30, 1936, in Great Britain and published in 1938 under No. 491,578.

Illustrated in Figs. 2, 3 and 4 is a presently preferred commercial embodiment of the invention which has been diagrammatically described in Fig. 1. A suitable housing is provided which is self-energized with an electric light so that the person viewing the stereo pictures may hold the device in his hands and place it before his eyes in a generally horizontal position. The entire viewer accordingly may be referred to by the numeral 25. The viewer 25 may be formed of four major structural elements, a bottom housing half 26, an upper housing half 27, a cowling member 28 disposed partly over the upper half, and a movable focusing frame 29 which retains the ocular lenses 23.

The bottom housing half 26 may have suitable recesses to receive flashlight batteries 31. It may also have an upwardly projecting tubular portion 32 for receiving the rotatable shaft 14 to which is connected the crank 16. The bottom of the housing 26 is formed with a slot 33 in which may be disposed a thumb nut 34. This thumb nut may be threaded on a non-rotatable screw 36 which passes through a smooth hole in a projecting lug 37 against which the thumb nut 34 bears.

The upper housing half 27 may register with the lower half 26 and may have a flat deck 38 formed thereon which is apertured to form a window 39 through which the pictures may be viewed. The deck may have a pair of raised ribs 41 (Fig. 3) disposed on each side of the picture frame 10 to guide that frame in its reciprocatory movements. The frame 10 may be formed of sheet material and may have a portion 10a adjacent the frame aperture 11 bent in a U-shape to resiliently engage the under side of the deck so that the entire frame 10 will be tightly pressed against the deck 38. Pictures to be viewed may be tightly clamped against the upper surface of the picture frame 10 by means of leaf springs 42.

The upper housing half 27 and the lower housing half 26 define an elongated aperture 43 in which the ocular frame 29 is disposed. The screw 36 may be pin jointed or otherwise connected to the ocular frame 29 as at 44. It will be noted that the center part of the ocular frame is recessed along an inclined surface as at 46 so that the nose of the user may fit within this recess while holding the frame 29 against his eyes. Movement of the frame 29 into and away from the housing halves 26 and 27 is accomplished by rotation of the thumb nut 34 which is held from movement by the edges of the slot 33 and which accordingly moves the non-rotatable screw 36 forward and back according to the direction of nut rotation.

Illustrated best in Fig. 4 is the cowling member 28 which closes off or covers over the battery portion of the lower housing half 26 and in addition forms a bulbous elongated cowling over the deck 38 exteriorly of the guide ribs 41. This cowling may have a translucent insert 47 made from any suitable material such as organic plastic. This provides illumination for inspection of stereo pictures prior to their viewing. The cowling 28 may also have a notch 48 formed on its forward end to form an aperture through which stereo picture pairs may be inserted into the holder frame 10. A suitable source of illumination may be provided such as an electric light 49 mounted in a metal bracket 51. Light 49 may be illuminated by a manual switch formed as a part of another bracket 52. The brackets 51 and 52 may electrically connect opposite ends of the flashlight batteries 31.

In operation the device of Figs. 2 to 4 is held in the hands of the person viewing the picture. The picture is inserted through the slot 48 (Fig. 4) so that it is held under the leaf springs 42 and over the frame aperture 11 and over the window 39 in the deck 38. The switch (not shown) is then pressed connecting the batteries 31 to the electric light 49 to illuminate the picture. Diffusion of illumination by reflection from the surface of the translucent material 47, instead of diffusion by transmission through said material has been found to give suitable lighting and the rays emanating from the illuminated picture (either a transparency or a picture on a light transmitting paper) may then be viewed by the person viewing. The direction of these rays of light is illustrated generally in Figs. 1 and 2. The user may then manually rotate the thumb lever 20 to obtain the correct interocular adjustment. Accordingly, rotation of the shaft 14 causes the crank 16 to operate in the slot 17 to move the entire picture holding frame 10 forward and backward. This adjusts the spacing of the transmitted rays as shown in Figs. 1 and 2 and in this connection it will be noted that the lenses 23 must have sufficient width or diameter that is optically clear so that the normal span of interocular distances can be accommodated. The user may then focus upon the picture by rotating the thumb nut 34 which will push or pull the non-rotatable screw 36 in or out, moving the frame 29 containing the ocular lenses.

It will be appreciated by those skilled in the art that various modifications may be made in the apparatus illustrated to carry out the purposes and objects of the invention. The described subject matter accordingly is illustrative only and I include all modifications and variations as fall within the true spirit and scope of this invention.

I claim:

A stereoscope for viewing oppositiaxially oriented picture pairs comprising: a lower housing half including a battery recess, an inner first pair of angularly disposed mirrors having a line of intersection, an outer second pair of angularly disposed mirrors, and a bushing at right angles and adjacent to the line of intersection of the first pair of mirrors; an upper housing half secured over the lower housing half and having a deck apertured to form a viewing window over said first mirror pair; a picture holding frame disposed on said deck and about said window and having a slot on one edge; a shaft disposed in the bushing and having a crank on one end fitting within said slot and a thumb lever affixed to the other end for rotating said shaft; a light disposed over said deck and said picture holding frame; batteries disposed in the lower housing half and connected to said light; a cowling disposed over the deck and the light and covering the picture frame and supporting the light, said cowling having a translucent insert positioned relative to said light for providing illumination from outside said cowling for inspection of stereo pictures prior to viewing and for diffusion of illumination from said light by reflection from inner diffusing surface of said translucent insert during viewing of the stereo pictures; a frame for a pair of ocular lenses mounted between the upper and lower housing halves for reciprocation parallel to the line of intersection of the first mirror pair; a pair of ocular lenses mounted in the lens frame; and means including a rotatable thumb nut and a non-rotatable screw, said screw being connected on one end to the lens frame and said thumb nut being threaded on the other end, said thumb nut being positioned adjacent said thumb lever and restrained from axial movement by the lower housing half whereby said thumb nut and said thumb lever are both in close thumb adjustable proximity, said thumb nut and screw means interconnecting the lower housing half and the lens frame for focusing the ocular lenses, each lens having an optical width sufficient to accommodate the range of common interocular distances.

References Cited in the file of this patent

UNITED STATES PATENTS

| | | |
|---|---|---|
| 1,865,683 | Edstrom | July 5, 1932 |
| 2,313,562 | Mainardi | Mar. 9, 1943 |
| 2,520,432 | Robertson | Aug. 29, 1950 |
| 2,666,360 | Collins | Jan. 19, 1954 |
| 2,693,128 | Dewhurst | Nov. 2, 1954 |
| 2,694,339 | Baireuther et al. | Nov. 16, 1954 |
| 2,781,691 | Mainardi et al. | Feb. 19, 1957 |
| 2,834,251 | Romrell | May 31, 1958 |

FOREIGN PATENTS

| | | |
|---|---|---|
| 814,797 | Germany | Sept. 27, 1951 |